United States Patent [19]

Hobart, Jr.

[11] 4,369,944

[45] Jan. 25, 1983

[54] UNIVERSAL STRAND CLAMP AND STRAND CLAMP ASSEMBLY

[75] Inventor: Floyd E. Hobart, Jr., Ironia, N.J.

[73] Assignee: Western Electric Company, Inc., New York, N.Y.

[21] Appl. No.: 173,794

[22] Filed: Jul. 30, 1980

[51] Int. Cl.³ .............................................. F16L 5/00
[52] U.S. Cl. ........................................ 248/56; 248/73
[58] Field of Search ............... 248/56, 74 R, 27.1, 248/27.3, 74 B, 74 PB, 73; 403/194, 215, 206, 197; 174/65 G

[56] References Cited

U.S. PATENT DOCUMENTS

| | | |
|---|---|---|
| 1,872,385 | 8/1932 | Andren . |
| 2,078,453 | 4/1937 | Miller .................................. 248/56 |
| 2,218,894 | 10/1940 | Schlosser ............................. 248/73 |
| 2,494,814 | 1/1950 | Huth ................................. 248/56 X |
| 2,901,725 | 8/1959 | Schuyler ........................ 403/215 X |
| 3,788,582 | 1/1974 | Swanquist ............................. 248/56 |
| 3,889,909 | 6/1975 | Koscik ................................. 248/56 |
| 3,936,129 | 2/1976 | Guy ............................... 339/103 R |
| 4,035,051 | 7/1977 | Guy ............................... 339/103 R |
| 4,299,363 | 11/1981 | Datschefski ......................... 248/56 |

FOREIGN PATENT DOCUMENTS 2336280 2/1975 Fed. Rep. of Germany .

Primary Examiner—William H. Schultz
Assistant Examiner—Ramón O. Ramírez
Attorney, Agent, or Firm—D. D. Bosben

[57] ABSTRACT

A universal strand clamp (10) is provided for securing a strand or cable (12) to a wall panel (14) to provide strain relief for terminating ends (16) of individual conductors (18) of the cable. The cable (12) is secured into a body portion (22) of the clamp (10) by a cable tie (20) which extends about portions of the outer periphery of the body portion and into a cross bore (40) of the body portion.

14 Claims, 5 Drawing Figures

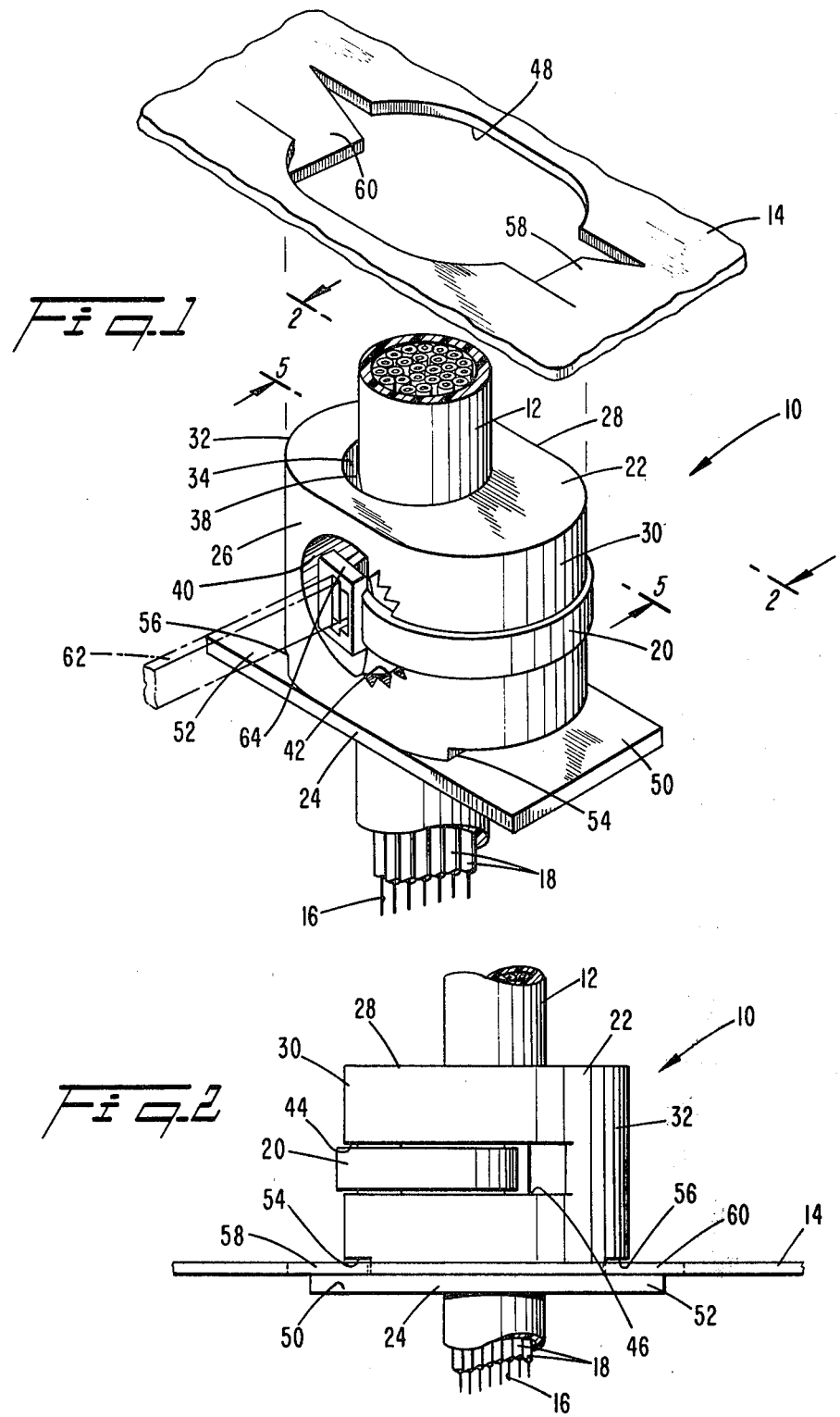

U.S. Patent  Jan. 25, 1983  Sheet 2 of 2  4,369,944
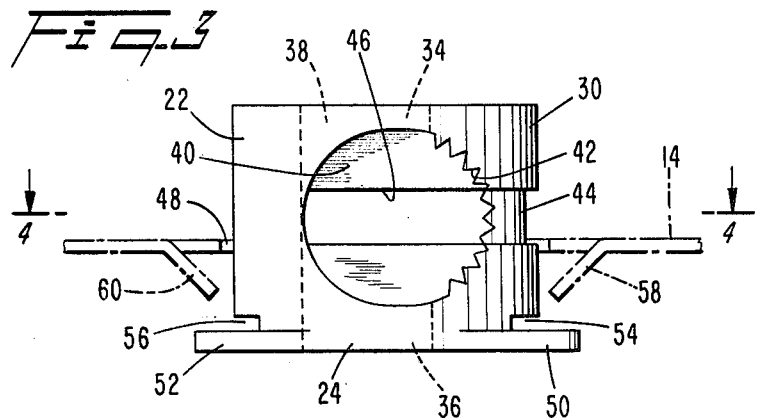
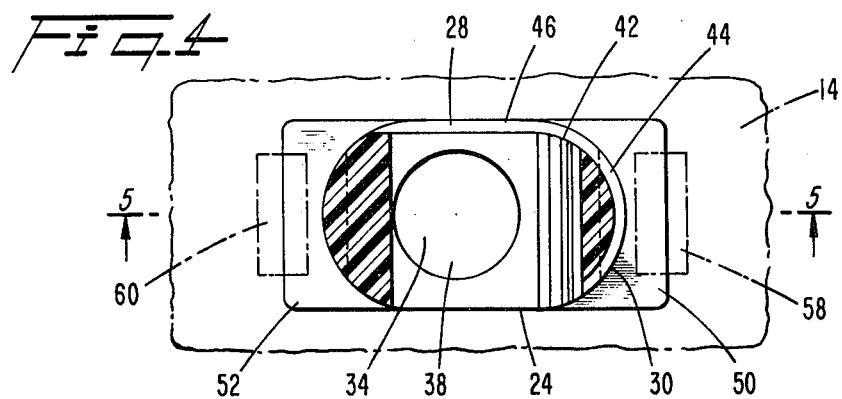
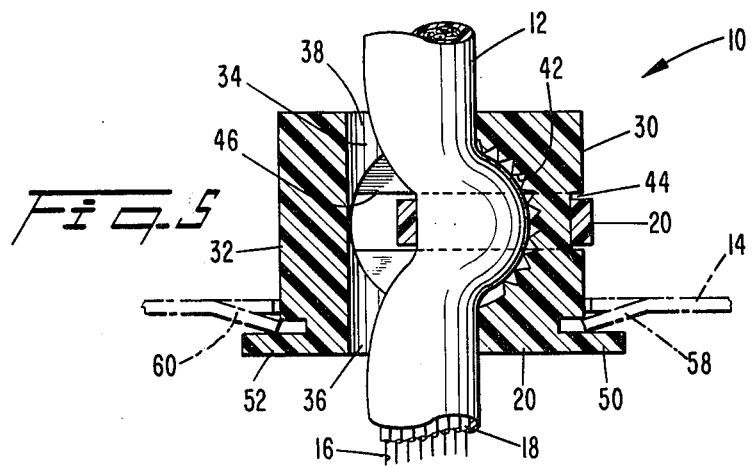

UNIVERSAL STRAND CLAMP AND STRAND CLAMP ASSEMBLY

TECHNICAL FIELD

This invention relates to a universal strand clamp and strand clamp assembly and particularly to a strand clamp and strand clamp assembly for providing strain relief for cables or wires having different diameters.

BACKGROUND OF THE INVENTION

In the assembly of various electronic apparatus it is common practice to secure terminating ends of conductors in cables, or one or more pairs of conductors, to terminals of various electronic components or circuit boards mounted within a housing, or in similar apparatus. In such instances, it is desirable to secure intermediate portions of the conductors or the cable to an adjacent wall member of the housing so as to provide strain relief for the terminating ends of the conductors so that any tension that may develop on the conductors or cable will not be transmitted to the terminating ends of the conductors. Preferably, a strain relief device for this purpose should be economical to manufacture, of simplistic design, and capable of being readily assembled and used with a variable number of conductors, including a single conductor pair, as well as a variety of cables having different diameters, without the need for stuffing filler material in and around the conductors.

In the past, a variety of strain relief devices have been proposed to accomplish the foregoing. For example, U.S. Pat. No. 3,788,582 to W. W. Swanguist discloses a connector for connecting non-metallic sheathed cable to an electrical box. The connector includes a tubular body defining a passageway for receiving a cable therethrough and a bisected mounting end which is contractable to permit insertion of the tubular body into an aperture in the electrical box. A rotary rigid cam member, which is journaled in the tubular body, is shaped to permit insertion of a cable through the passageway in the tubular body when the cam member is in a first position. When the cam member is rotated to a second inverted position, the cable is deformed by the cam member into a recess formed in the body in opposed relation to the cam member. The operation of the cam member in this fashion causes the cable to be secured tightly into the clamp and also causes the mounting end of the clamp to expand, thereby locking the clamp into the aperture of the electrical box.

SUMMARY OF THE INVENTION

This invention is directed to a universal clamp and strand clamp assembly member for securing a flexible strand, such as a cable or individual conductors, to a wall panel or housing to provide strain relief for terminating ends of the strand. In general, the clamp member includes a body portion extending perpendicularly from a base wherein the base and the body portion include a longitudinal passageway extending therethrough for receiving a flexible strand. The body portion further includes first and second opposite sidewalls with respective first and second aligned openings extending into the longitudinal passageway, for receiving a strand tie member. Securing means are provided at one end of the body portion adjacent the base for securing the clamp to an associated device, such as a wall panel.

More particularly, the first opening in the first sidewall of the body portion is defined by a circular cross bore which extends through the body portion to the second sidewall, and the second opening of the second sidewall is defined by a rectangular guide slot. An inner wall, which is formed by the circular cross bore, is offset with respect to the longitudinal passageway and includes strand-gripping serrations formed thereon. The body portion further includes a peripherally extending groove formed in an outer surface and which communicates at opposite ends with the cross bore and the rectangular slot. The securing means includes a pair of flanges extending laterally from the base and spaced from the body portion to define notches for receiving portions of the associated device.

BRIEF DESCRIPTION OF THE DRAWINGS

FIG. 1 is an isometric view showing a universal strand clamp member in accordance with this invention having a cable clamped therein, prior to assembly of the clamp member with an associated wall panel;

FIG. 2 is a rear elevation view of the strand clamp member as viewed along line 2—2 of FIG. 1, assembled with the wall panel shown in FIG. 1;

FIG. 3 is a front elevation view of the strand clamp member in accordance with this invention;

FIG. 4 is a cross-sectional view taken along line 4—4 of FIG. 3; and

FIG. 5 is a cross-sectional view taken along line 5—5 of FIG. 1.

DETAILED DESCRIPTION

Referring to FIG. 1, the disclosed embodiment of the invention relates to a universal strand or cable clamp member 10 of one-piece molded construction which can be utilized for clamping strands of various diameters, such as a cable 12, to a metal wall panel 14 of an electronic apparatus housing or chassis, to provide strain relief for the cable. By way of example, the clamp member 10 may provide strain relief for terminating ends 16 of one or more pairs of electrical conductors 18 of the cable 12 which are to be connected to respective terminals (not shown). The cable 12 is secured into the clamp member 10 with a cable tie 20 which extends about an outer portion of the clamp and about an intermediate portion of the cable. The cable clamp member 10 may be formed of any suitable thermoplastic resin, such as polypropylene.

The cable clamp member 10 includes an elliptically-shaped body portion 22 extending perpendicularly from a base 24 and having opposite sidewalls 26 and 28 and opposite arcuate end walls 30 and 32. As is best shown in FIG. 3, the body portion 22 and the base 24 include aligned apertures 34 and 36, respectively, which define a longitudinally extending passageway 38 for receiving an intermediate portion of the cable 12 therein.

Referring to FIGS. 1 and 3, a cross bore 40, which perpendicularly intersects the passageway 38, opens through the sidewall 26 and extends through the body portion 22 to the sidewall 28. The cross bore 40 is formed with a plurality of peripherally spaced cable-gripping serrations 42 along a portion of an arcuate inner wall thereof, which is offset with respect to the longitudinally passageway 38, with the serrations projecting radially inward and extending parallel to the longitudinal axis of the cross bore.

An elongated arcuate groove 44 is formed along the outer surface of the arcuate end wall 30 of the body portion 22 and defines a seat for receiving an intermediate portion of the cable tie 20. As is best shown in FIGS. 3 and 4, at the junction of the arcuate end wall 30 and the sidewall 28, the arcuate groove 44 merges with a rectangular guide slot 46 which is formed in the sidewall 28 and through which the cable tie 20 can be inserted into the cross bore 40.

In mounting the cable clamp member 10 in the wall panel 14, the cable clamp member is inserted into, and then retained in, a cut-out 48 (best shown in FIG. 1) formed in the wall panel. For this purpose, a pair of opposed laterally extending flange portions 50 and 52 extend outwardly from the base 24 of the clamp member 10 and are spaced from adjacent end portions of the body portion 22 to define a pair of notches 54 and 56, respectively, on either side of the body portion. The wall panel 14, as viewed in FIG. 1, includes a pair of downwardly extending flexible locking tabs 58 and 60 which are formed at opposite ends of the cut-out 48 and which are receivable within the notches 54 and 56, respectively, as the clamp member 10 is moved upwardly in FIG. 2 into the cut-out. In this connection, the flexible tabs 58 and 60 are bent upwardly in FIG. 2 by engagement with the flanges 50 and 52 of the base 24, respectively, into the plane of the wall panel 14 as the body portion 22 of the clamp is pushed into the cut-out 48 of the wall panel. The flexible tabs 58 and 60 then remain in their bent position in the notches 54 and 56 in the clamp member 10 as shown in FIG. 2, to lock the clamp in place on the wall panel. The flange portions 50 and 52, which serve as guides for the tabs 58 and 60 to bend and direct the tabs into the notches 54 and 56, also form stop surfaces for the clamp member 10 when the body portion 22 is inserted into the cut-out 48.

To secure the cable 12 to the cable clamp member 10, the terminating ends 16 of the cable are first extended through the passageway 38 defined by the aligned apertures 34 and 36 of the body portion 22 and the base 24, respectively. A tail end 62 (FIG. 1) of the cable tie 20 is then extended through the elongated guide slot 46 formed in the sidewall 28 of the body portion 22, through the cross bore 40 of the body portion, and through a head or eyelet 64 (FIG. 1) of the cable tie. The head 64 of the cable tie 20 is then disposed in the cross bore 40 of the body portion 22, as shown in FIG. 1, and an intermediate portion of the cable tie 20 is disposed in the arcuate groove 44 of the body portion. When the cable tie 20 is then tightened about the cable 12, an intermediate portion of the cable is deformed into an arcuate configuration as illustrated in FIG. 5 and pressed against the serrations 42 of the offset inner wall of the cross bore 40. The inner wall serrations 42 then grip the cable 12 and inhibit the cable from slipping longitudinally in the clamp member 10. After the cable tie 20 has been tightened, any portion of the tail end 62 of the tie projecting from the head 64 of the tie may be clipped off in a known manner.

In summary, a new and improved strain relief device in the form of the cable clamp member 10, when utilized in conjunction with the cable tie 20, has been disclosed. The cable clamp member 10 is economical to manufacture, of simplistic design, and, in conjunction with the cable tie 20, capable of being readily assembled and used with one or more pairs of conductors, including cables 12 of various diameters, without the need for filler material in and around the conductors or cable. Further, the cable 12 can readily be removed from the cable clamp member 10, and replaced with another cable, or where the cable member clamp is being utilized with one or more pairs of individual conductors (not shown), the conductors can readily be removed from the cable clamp member or inserted into the cable clamp member, merely by cutting the cable tie 20 and replacing it with another cable tie.

What is claimed is:

1. A universal clamp member comprising:

a base;

a body portion extending perpendicular from the base;

the body portion and the base having a longitudinally extending passageway formed therethrough for receiving a strand, the body portion also having first and second opposite sidewalls with respective first and second aligned openings extending into the longitudinal passageway, for receiving a strand tie member, the body portion is formed with an inner wall which is offset with respect to the longitudinal passageway for receiving a portion of the strand depressed therein by the strand tie member; and means adjacent one end of the body portion for securing the clamp member to an associated device.

2. A universal strand clamp member as recited in claim 1 wherein the inner wall is formed with a plurality of strand-gripping serrations.

3. A universal strand clamp member as recited in claim 1, wherein the means for securing the clamp to an associated device includes a pair of flanges extending laterally from the base and spaced from the one end of body portion to define notches for receiving portions of the associated device.

4. A univeral strand clamp member as recited in claim 1, wherein a peripherally extending groove is formed in an outer surface of the body portion and communicates at opposite ends with the aligned openings of the first and second sidewalls.

5. A universal strand clamp member as defined in claim 1, in which the strand clamp is of one-piece molded construction.

6. A universal strand clamp member as recited in claim 1, wherein the first opening of the first sidewall is defined by a circular cross bore which extends through the body portion to the second sidewall, and the second opening of the second sidewall is defined by a rectangular guide slot.

7. The strand clamp member as recited in claims 1 or 2 wherein the inner wall is arcuate.

8. A universal strand clamp member of one-piece molded construction comprising:

a base;

a body portion extending perpendicularly from the base, the body portion and the base having a longitudinally extending passageway formed therethrough for receiving a strand, the body portion also having first and second opposite sidewalls with respective first and second aligned openings extending into the longitudinal passageway, for receiving a strand tie member, the first opening in the first sidewall being defined by a circular cross bore which extends through the body portion to the second sidewall and the second opening in the second sidewall being defined by a rectangular guide slot;

an arcuate inner wall formed in the body portion by the circular cross bore, the arcuate inner wall being offset with respect to the longitudinal passageway;

a peripherally extending groove formed in an outer surface of the body portion and communicating at opposite ends with the cross bore and the rectangular guide slot of the second sidewall; and a pair of flanges extending laterally from the base and spaced from the body portion to define notches for receiving portions of an associated device.

9. A universal strand clamp member as recited in claim 8, wherein the arcuate inner wall includes a plurality of strand gripping serrations formed thereon.

10. A strand clamp assembly, which comprises:

a clamp member having a passageway extending therethrough for receiving a strand, the clamp member also having first and second opposite sidewalls with respective first and second aligned openings extending into the longitudinal passageway;

a strand tie member extending through the first and second aligned openings in the first and second opposite sidewalls of the clamp member and about an outer portion of the clamp member, for clamping the strand in the clamp member; and the clamp member is formed with an inner wall which is offset with respect to the longitudinal passageway and against which the strand is deformed by the strand tie member to secure the strand against movement within the clamp member.

11. A strand clamp assembly as recited in claim 10, wherein the inner wall of the clamp member includes a plurality of strand-gripping serrations formed therein.

12. A strand clamp assembly as recited in claim 10, wherein a peripherally extending groove is formed in an outer surface of the clamp member and communicates at opposite ends with the aligned openings of the first and second sidewalls, the strand tie member being disposed in the peripherally extending groove.

13. A strand clamp assembly as recited in claim 10, wherein the first opening of the first sidewall in the strand clamp member is defined by a circular crossbore which extends through the strand clamp member to the second sidewall, and the second opening of the second sidewall in the strand clamp member is defined by a rectangular guide slot for the strand tie member.

14. The strand clamp assembly as recited in claims 10 or 11 wherein the inner wall is arcuate.

* * * * *